L. B. STRONG.
TRANSMISSION MECHANISM.
APPLICATION FILED SEPT. 26, 1919.
1,397,494.
Patented Nov. 15, 1921.
2 SHEETS—SHEET 1.
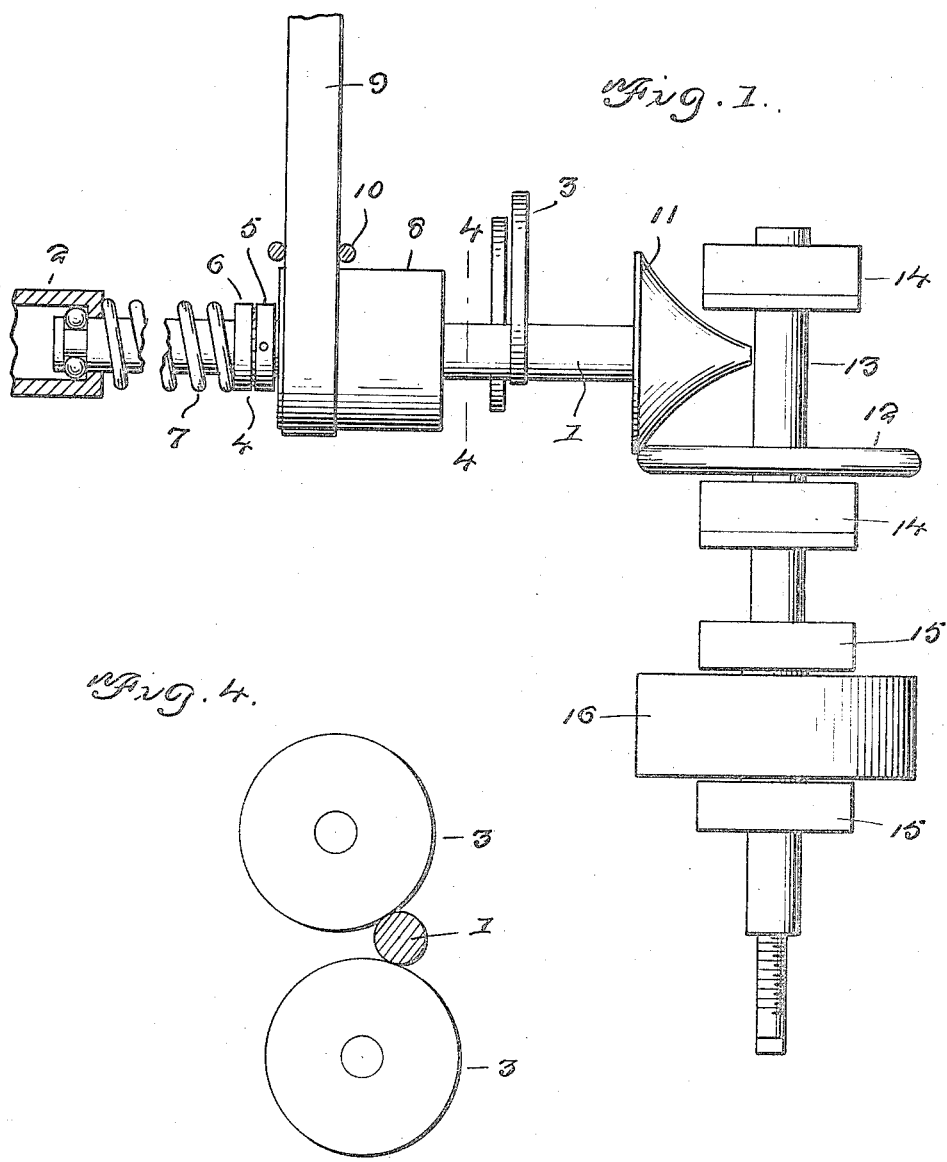

L. B. STRONG.
TRANSMISSION MECHANISM.
APPLICATION FILED SEPT. 26, 1919.
1,397,494.
Patented Nov. 15, 1921.
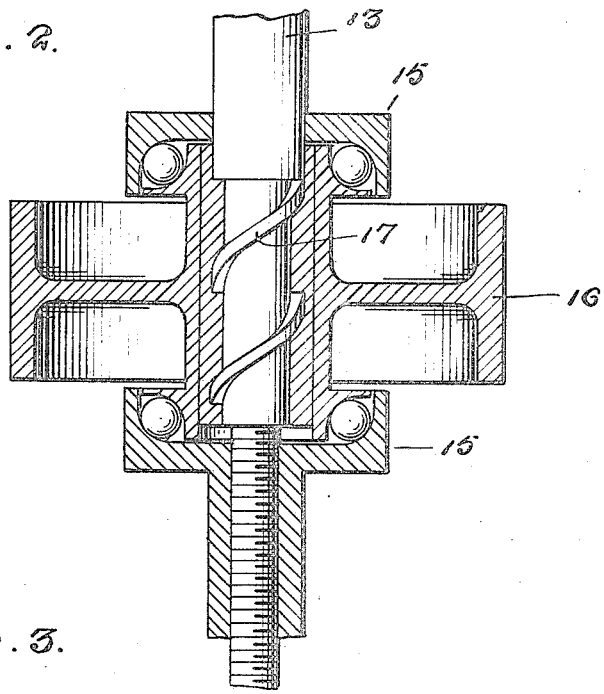
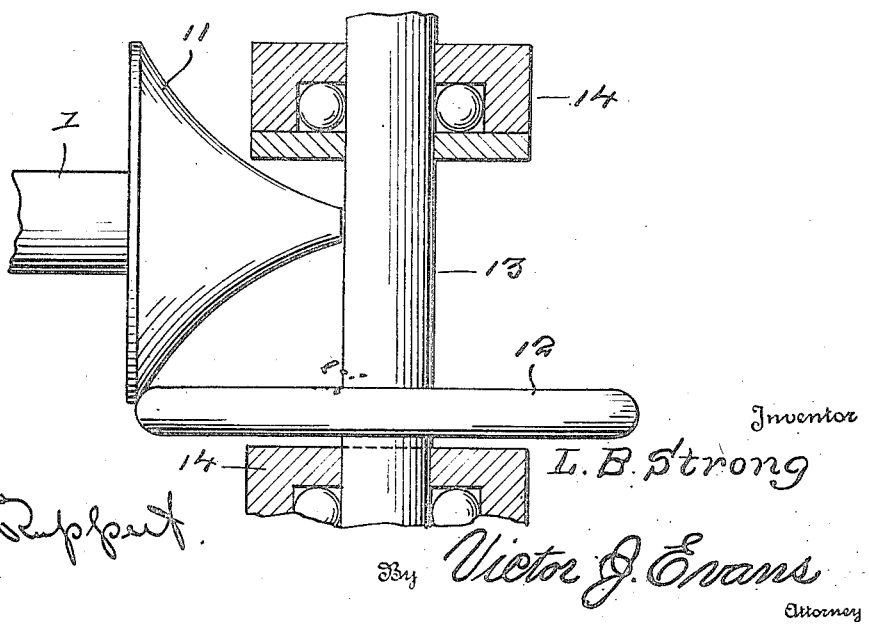

UNITED STATES PATENT OFFICE.

LEON B. STRONG, OF LIVINGSTON, MONTANA.

TRANSMISSION MECHANISM.

1,397,494.   Specification of Letters Patent.   Patented Nov. 15, 1921.

Application filed September 26, 1919. Serial No. 326,433.

*To all whom it may concern:*

Be it known that I, LEON B. STRONG, a citizen of the United States, residing at Livingston, in the county of Park and State of Montana, have invented new and useful Improvements in Transmission Mechanism, of which the following is a specification.

This invention relates to a transmission mechanism and has for its primary object to provide a mechanism the parts of which are so constructed and arranged that the speed of a driven shaft and its connection with the drive shaft will be automatically controlled according to the load, so that the drive shaft may operate at a constant speed thereby operating the prime mover at its most efficient speed.

An object of the invention is to provide small mechanical means for automatically adjusting the connection between the drive shaft and a driven shaft for increasing the power of a driven shaft in accordance with the load, without materially affecting the speed of the drive shaft.

With these and other objects in view the invention will be better understood from the following detailed description taken in connection with the accompanying drawings, wherein:

Figure 1 is a top plan view of the mechanism.

Fig. 2 is a section view of the pulley.

Fig. 3 is a fragmentary view, partly in section.

Fig. 4 is a section view of the adjusting means for the drive shaft.

Again referring to the drawing illustrating one manner in which the invention may be constructed the numeral 1 designates a drive shaft having one end portion mounted in a bearing 2 so as to be longitudinally adjustable, while its other end portion is supported by offset wheel bearing 3. The wheels 3 are so positioned as to receive an equal thrust in the operation of parts hereinafter described. A thrust bearing 4 has one part 5 fixed to the shaft 1, while the other part 6 is loosely mounted on the shaft, and is engaged by one end of a coil spring 7 that has its other end bearing against the bearing 2. Thus it will be seen that the shaft 1 is constantly forced to the right. Mounted upon the shaft 1 is the elongated pulley 8 so as to have proper engagement with the belt 9 in the longitudinal movements of the shaft 1. A guide 10 prevents displacement of the belt 9. Fixed to one end of the shaft 1 is a cone 11.

Arranged in engagement with the surface of the cone 11 is a disk 12 mounted on a driven shaft 13 also mounted for longitudinal movement in bearings 14. By moving the driven shaft longitudinally it will be seen that due to the relative engagement of the cone and disk the shaft 1 will be automatically moved longitudinally for changing the point of engagement of the disk with the cone. This action allows the shaft 13 to run at a reduced speed without reducing the speed of shaft 1 which enables the prime mover to operate at its most efficient speed without being affected by the change in load.

In the drawings I have shown automatic means for shifting the shaft 13 in accordance with the load but I wish it to be understood that other means may be substituted, and in fact a manually operated device may be used for giving longitudinal movement to the shaft 13. Fixed against lateral displacement between bearings 15 is a pulley 16 having a feed screw connection 17 with the shaft 13. The pulley 16 is connected to the load and when the load is of a predetermined degree the parts will assume a position as illustrated in Fig. 1, so that the driven shaft will be operated at its maximum speed, but should the load increase an amount great enough the driven shaft will turn independent of the pulley and through the feed screw connection 17 the driven shaft will be shifted longitudinally for changing the point of contact of disk 12 with cone 11 for accommodating the increase in load. Should the load continue to increase the disk 12 will continue to advance along the cone, until the portion of the cone of the smallest diameter engages the disk which increases the power transmitted to the driven shaft.

It is of couse to be understood that the parts may be constructed in various other manners and associated in other relations, and therefore I do not desire to be limited in any manner except as set forth in the claim hereunto appended.

What I claim is:—

A transmission mechanism comprising a yieldably supported drive shaft, a cone carried by one end thereof, a driven shaft arranged at a right angle to the drive shaft, a disk carried by the second mentioned shaft and normally engaging that portion of the cone of greatest diameter, spaced bearings supporting the driven shaft, a sleeve surrounding the latter mentioned shaft between said bearings, a spiral thread carried by said shaft, a spiral groove formed in said sleeve to receive the thread, a pulley mounted on the sleeve between the bearings, flanges formed on the hub of the pulley, and ball bearings arranged between the flanges and said bearings for the purpose specified.

In testimony whereof I affix my signature.

LEON B. STRONG.